United States Patent [19]

Wilson

[11] 4,055,298
[45] Oct. 25, 1977

[54] THERMALLY RESPONSIVE BY-PASS VALVE DEVICE PROVIDING MAXIMUM FLOW AREA

[75] Inventor: Earl L. Wilson, Wellesley, Mass.
[73] Assignee: Standard-Thomson Corporation, Waltham, Mass.
[21] Appl. No.: 650,151
[22] Filed: Jan. 19, 1976
[51] Int. Cl.² .............................................. F01P 7/02
[52] U.S. Cl. .................. 236/34.5; 123/41.09; 236/100
[58] Field of Search .............. 236/34, 100, 34.5; 123/41.09; 251/361

[56] References Cited

U.S. PATENT DOCUMENTS

| | | | |
|---|---|---|---|
| 2,695,032 | 11/1954 | Kmiecik | 251/361 X |
| 2,847,165 | 8/1958 | Freismuth | 236/34.5 |
| 2,919,860 | 1/1960 | Wagner | 236/34.5 |
| 3,248,056 | 4/1966 | Obermaier | 236/34 |
| 3,353,745 | 11/1967 | Beatenbough | 236/34 |
| 3,591,075 | 7/1971 | Onishi | 236/34 |
| 3,606,149 | 9/1971 | Obermaier et al. | 236/34 |

Primary Examiner—William E. Wayner
Assistant Examiner—William E. Tapolcai, Jr.
Attorney, Agent, or Firm—Jacox & Meckstroth

[57] ABSTRACT

A thermally responsive by-pass valve device which permits maximum fluid flow in limited area conditions. The valve device is adapted to be employed in an environment in which there are limited area conditions within conduit structure having a plurality of flow passages in a by-pass type of cooling system of an internal combustion engine. The by-pass valve device is provided with valve seat structure which has an entrance opening and an exit opening, and there is an internal wall surface of gradually increasing dimensions between the exit opening to the entrance opening. Thermally responsive actuator mechanism is positioned within the openings of the valve seat structure. The portions of the actuator mechanism which occupy the greatest area are positioned in lateral alignment with the portion of the internal wall surface having the greatest dimension, and the portions of the actuator mechanism which are of a lesser area are positioned in lateral alignment with the portion of the internal wall surface having a lesser dimension. Thus, there is minimum restriction and maximum flow area through the valve seat structure.

6 Claims, 4 Drawing Figures ature of the same general type as that of this invention; however, in the devices of each of these patents, elements are not arranged to provide maximum fluid flow through a valve seat member within which a thermally responsive actuator member is positioned.

THERMALLY RESPONSIVE BY-PASS VALVE DEVICE PROVIDING MAXIMUM FLOW AREA

BACKGROUND OF THE INVENTION

The cooling system of numerous types of automotive engines has fluid flow conduit structure in which there are a plurality of flow passages. This type of structure is sometimes referred to as a fluid flow by-pass cooling system. A conventional by-pass valve structure includes a hollow closure member, open at each end, which is slidably movable within an opening within the conduit structure. The closure member is capable of directing fluid flow directly from one flow passage to another flow passage, and is axially movable to provide communication between two flow passages while closing communication between two of the flow passages. The size of the opening within which the hollow closure member is movable is predetermined by the engine manufacturer and is smaller than the size of an opening in the valve seat member within which an actuator portion of the valve device is positioned. The actuator portion of the valve device occupies a significant area, and thus the area for fluid flow through the opening is reduced. In order to provide maximum area for fluid flow through the valve seat member it is customary to have the largest opening possible through the valve seat member. This opening is greater than the opening through the closure member. It has been customary to provide an inclined portion at the end of the hollow closure member which engages the valve seat member so that the opening through the valve seat member is a maximum and the opening into the closure member is a maximum, even though the opening through the closure member is smaller.

However, it has been found that an inclined flange at the entrance end of the hollow closure member in the conventional by-pass valve device is objectionable due to the fact that pressure of the fluid engaging the inclined flange may be sufficient to move the closure member from the valve seat. Such movement of the closure member as a result of pressure is objectionable due to the fact that operation of the valve device should be responsive only to temperature and should not be affected by fluid pressures.

Therefore, it is an object of this invention to provide a thermally responsive by-pass valve device which includes means by which a maximum fluid flow area can be maintained through an opening in a valve seat member within which an actuator member is disposed, while maintaining the valve device as one which is not affected by fluid pressures.

It is another object of this invention to provide such a by-pass valve device which readily replaces a conventional by-pass type of valve device.

It is another object of this invention to provide such a thermally responsive by-pass valve device which can be produced at substantially the same costs as a conventional type of thermally responsive by-pass valve device.

U.S. Pat. Nos. 2,919,860 and 3,129,885 disclose structure of the same general type as that of this invention; however, in the devices of each of these patents, elements are not arranged to provide maximum fluid flow through a valve seat member within which a thermally responsive actuator member is positioned.

DETAILED DESCRIPTION OF THE PREFERRED EMBODIMENT

A thermally responsive valve device of this invention is particularly adapted for use in conduit structure of the cooling system of an internal combustion engine in which the conduit structure is a by-pass type of conduit structure and is provided with a plurality of flow passages. In this type of cooling system the fluid pressures are usually relatively high, and high volumes of fluid flow are required to cool the internal combustion engine during operation thereof.

Figure 1:
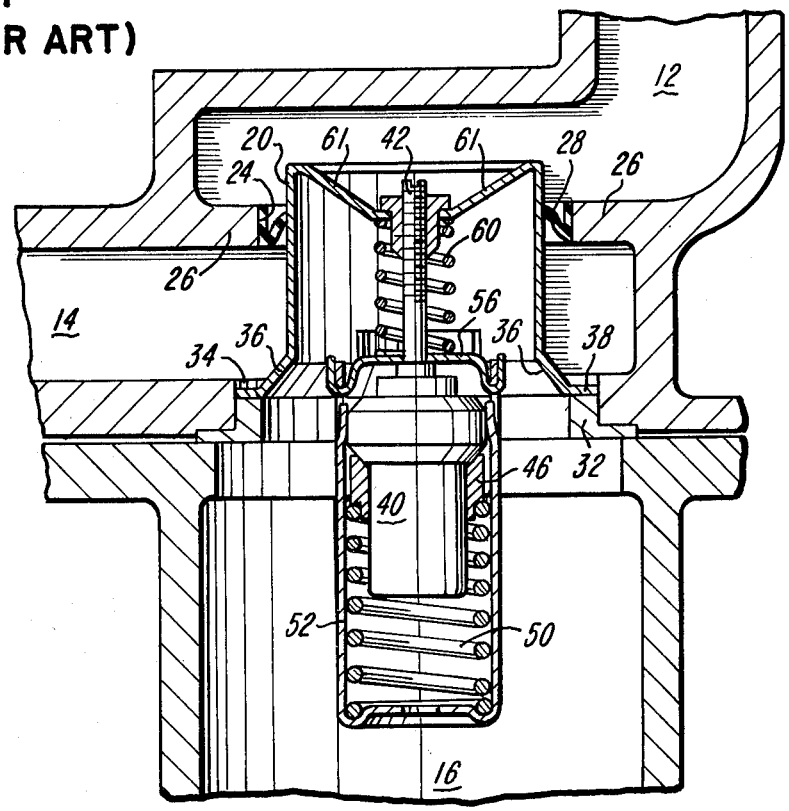
FIG. 1 is a side sectional view showing a prior art by-pass valve device in a by-pass conduit structure.

FIG. 1 illustrates a conventional type of thermally responsive by-pass valve device in a by-pass type of fluid flow conduit structure. This conduit structure includes a flow passage 12, a flow passage 14, and a flow passage 16. The flow passage 16 is an inlet or upstream flow passage, and fluid flowing upwardly from the flow passage 16 is directed to flow either into the flow passage 12 or into the flow passage 14 or into both the flow passage 12 and the flow passage 14.

A closure member 20, which is open at both ends thereof, is axially movable within an opening 24 of a wall 26. A sealing member 28 within the opening 24 encompasses the closure member 20. An annular valve seat member 32 is retained within an opening 34 which is between the flow passage 16 and the flow passage 14.

The closure member 20 has a tapered or inclined lower end portion 36 of gradually increasing dimension, with an engagement portion 38 extending laterally from the lower end of the tapered or inclined end portion 36 and engageable with the annular valve seat member 32.

A thermally responsive actuator member 40 has a stem portion 42 attached to the closure member 20. The thermally responsive actuator 40 may be any pressure-insensitive type. The actuator 40 is firmly supported by a support member 46 which is also attached through arm members, not shown, to the annular valve seat member 32. A helical spring 50 encompasses the actuator member 40 and joins the actuator member 40 to a connector member 52, which is engaged by the helical spring 50. The connector member 52 is joined by a link 56 to the actuator stem portion 42. The link 56 is shown as encompassing the stem portion 42 and is engaged by a helical spring 60 which encompasses the stem portion 42 and also engages arm members 61, which join the stem portion 42 to the closure member 20.

In the positions of the elements shown in FIG. 1, fluid flows from the flow passage 16 through the closure member 20 and into the flow passage 12. When the thermally responsive actuator member 40 senses increased temperatures above a predetermined value, the actuator stem portion 42 is moved upwardly and moves the closure member 20 upwardly, to gradually close fluid flow to the passage 12 and to gradually open fluid flow to the flow passage 14.

A problem exists in regard to valve structure of the type shown in FIG. 1. As shown and as discussed above, the lower end portion 36 is tapered or inclined in order to provide a sufficiently large flow passage which is not excessively restricted by the elements therewithin. However, the tapered or inclined lower end portion 36 provides a surface upon which fluid pressure is created as fluid flows upwardly through the closure member 20. It has been found that high fluid pressures upon the tapered lower end portion 36 force the closure member 20 to move upwardly, against the forces of the spring 60. Thus, communication between the flow passage 16 and the flow passage 14 is provided before the temperature of the fluid is at a temperature sufficiently high that fluid should flow from the flow passage 16 to the flow passage 14. This is, of course, objectionable.

Figure 2:
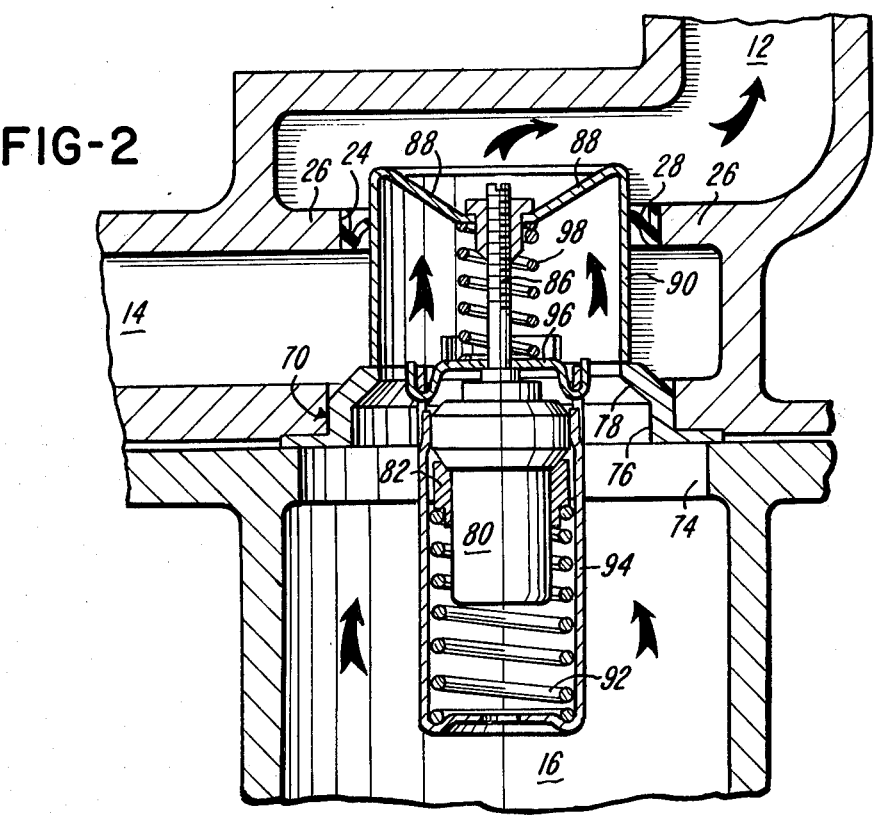
FIG. 2 is a side sectional view similar to FIG. 1, showing the by-pass conduit structure of FIG. 1, but showing a thermally responsive by-pass valve device of this invention within the by-pass conduit structure.
Figure 3:
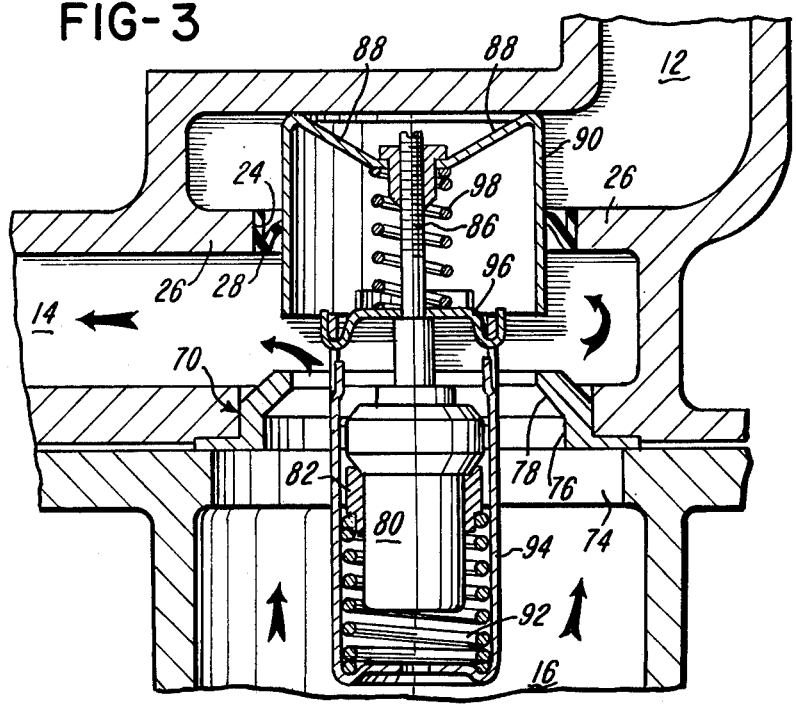
FIG. 3 is a side sectional view similar to FIG. 2, showing the thermally responsive by-pass valve device of FIG. 2 in another position of operation.
Figure 4:
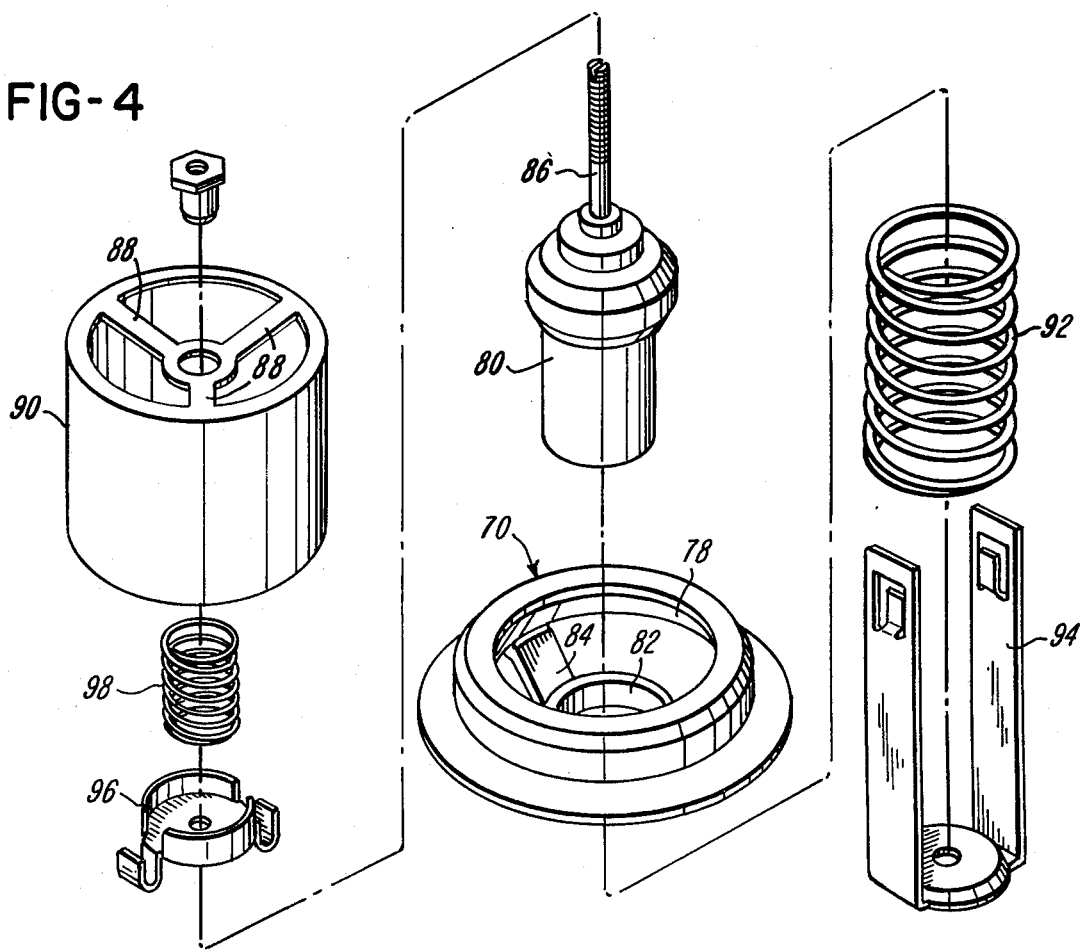
FIG. 4 is an exploded perspective view of the thermally responsive by-pass valve device of FIGS. 2 and 3.

FIGS. 2, 3, and 4

The thermally responsive by-pass valve device of this invention, as illustrated in FIGS. 2, 3, and 4 solves the problem discussed above and is adapted to replace a thermally responsive by-pass valve device of the type illustrated in FIG. 1. The thermally responsive by-pass valve device of this invention is shown positioned within the conduit structure of FIG. 1. The thermally responsive by-pass valve device of this invention comprises an annular valve seat member 70, which is retained in position within an opening 74, between the flow passage 16 and the flow passage 14. The annular valve seat member 70 has an axially extending internal cylindrical wall portion 76 and an internal inclined wall portion 78. The upper end portion of the annular valve seat member 70 thus has an opening which is considerably smaller than the opening at the lower end of the valve seat member 70. The opening in the upper end portion of the annular valve seat member 70 is substantially equal to the opening 24 between the flow passage 14 and the flow passage 12.

A thermally responsive actuator member 80 is supported by a collar 82 which is attached to one or more strut members 84, shown in FIG. 4. The actuator member 80 may be of any suitable pressure-insensitive type and may, for example, by of the type disclosed in U.S. Pat. Nos. 2,806,375 and 2,806,376. The thermally responsive actuator member 80 has an actuator stem 86 which, by means of arms 88, is attached to a movable cylindrical closure member 90 which is open at both ends thereof.

A helical spring 92 encompasses the actuator member 80 and joins the actuator member 80 to a connector member 94. The connector member 94 is joined by a link 96 to the actuator stem 86. The link 96 is shown as encompassing the actuator stem 86 and is engaged by a helical spring 98 which encompasses the actuator stem 86.

The hollow movable cylindrical closure member 90 normally engages the valve seat member 70 and closely encompasses the opening at the upper end portion of the valve seat member 70.

It is to be noted that the portions of the actuator member 80 which have the greatest cross-sectional area are positioned within the valve seat member 70 at portions thereof having the greatest area of opening, and the link 96 and the lower end of the actuator stem 86 having small cross-sectional area, are positoned within or adjacent the smaller opening at the upper end of the valve seat member 70. Thus, the elements which create the greatest restriction to fluid flow through the valve seat member 70 are positioned within the portion of the valve seat member 70 which have the greatest opening and the elements which are positioned within the portion of the valve seat member 70 having the smallest opening are elements having small restriction to fluid flow. Thus, maximum fluid flow through the valve seat member 70 is permitted, while providing an opening at the upper end thereof which is the maximum possible for flow directly into the movable cylindrical closure member 90. Thus, the movable cylindrical closure member 90 constitutes the largest diameter closure member which is movable within the opening 24 between the flow passages 14 and 12 and the upper end of the valve seat member 70 provides the greatest opening which may be closed by engagement with the movable cylindrical closure member 90, and the elements encompassed by the valve seat member 70 are so positioned and arranged with respect to the areas of the openings through the valve seat member 70 that maximum fluid flow through the valve seat member 70 is possible.

FIG. 3 shows the maximum upward position of the movable cylindrical closure member 90. In this position the upper end of the movable cylindrical closure member 90 engages a wall which partially forms the flow passage 12, and all of the fluid flowing through the valve seat member 70 flows into the flow passage 14.

Although the preferred embodiment of the thermally responsive by-pass valve device of this invention has been described, it will be understood that within the purview of this invention various changes may be made in the form, details, proportion and arrangement of parts, the combination thereof, and mode of operation, which generally stated consist in a device capable of carrying out the objects set forth, as disclosed and defined in the appended claims.

The invention having thus been described, the following is claimed:

1. Thermally responsive valve mechanism for the cooling system of an automotive engine which has a plurality of flow passages, there being a first flow passage, a second flow passage, and a third flow passage, there being a first wall between the first flow passage and the second flow passage with an opening of a given dimension in the first wall, there being a second wall between the second flow passage and the third flow passage, the opening in the second wall having a greater dimension than the opening in the first wall, there being continuous fluid flow through the opening in the second wall during operation of the engine, the improvement comprising:

an annular valve seat member within the opening in the second wall, the annular valve seat member having a downstream opening which has a dimension substantially equal to the given dimension of the opening in the first wall, the annular valve seat member having an upstream opening which is greater than the downstream opening thereof, the valve seat member having an internal wall of gradually decreasing dimension between the upstream opening thereof and the downstream opening thereof, a hollow cylindrical valve member slidably axially movable within the opening in the first wall, the hollow cylindrical valve member being engageable with the valve seat member to encompass the downstream opening and to close communication between the third flow passage and the second flow passage while providing communication between the third flow passage and the first flow passage, the hollow cylindrical valve member being movable to spaced relationship from the valve seat member to permit communication between the third flow passage and the second flow passage, thermally responsive actuator means having a portion encompassed by the internal wall of the valve seat member, the thermally responsive actuator means having a movable portion, means attaching the movable portion of the thermally responsive actuator means to the hollow cylindrical valve member for axial movement thereof, the thermally responsive actuator means having a portion of greater cross-sectional dimension and a portion of lesser cross-sectional dimension, the portion of greater cross-sectional dimension being at a position encompassed by a part of the internal wall of the valve seat member which has a greater dimension, and the thermally responsive actuator means having a portion of lesser cross-sectional dimension encompassed by a part of the internal wall of the valve seat member which has a lesser dimension, so that the area for fluid flow at the downstream opening of the annular valve seat member is at least equal to the area for fluid flow at the upstream opening of the annular valve seat member.

2. The valve mechanism of claim 1 in which the valve seat member has a cylindrical internal wall portion at one end of which is the upstream opening, the cylindrical internal wall portion being joined to said internal wall of gradually decreasing dimension.

3. The valve mechanism of claim 1 in which the smallest diameter portion of the internal wall forms the downstream opening.

4. The valve mechanism of claim 1 in which the thermally responsive actuator means has a stem portion, and in which the valve mechanism includes a link encompassing the stem portion and movable therewith, a resilient member encompassing the stem portion and in engagement with the link, arm members attached to the hollow cylindrical valve member, the resilient means engaging the arm members for movement of the hollow cylindrical valve member with movement of the stem portion, the link being within the downstream opening when the hollow cylindrical valve member engages the valve seat member.

5. Thermally responsive valve mechanism for a cooling system of an internal combustion engine in which the system is provided with conduit structure having wall members forming a first flow passage, a second flow passage, and a third flow passage, there being a first opening between the second and first flow passages, and a second opening between the second and third flow passages, the first opening being greater than the second opening, the openings being in alignment, there being continuous fluid flow through the second opening during operation of the engine, the improvement comprising:

a hollow cylindrical closure member slidably axially movable within the second opening, the hollow cylindrical closure member having opposed open ends, an annular valve seat member within the second opening and forming a fluid port therethrough, the annular valve seat member having a flow inlet opening and a flow exit opening, the flow exit opening being substantially equal to the second opening, the flow inlet opening being substantially greater than the flow exit opening, the annular valve seat member having an annular engagement surface encompassing the flow exit opening thereof and engageable by an end of the hollow cylindrical closure member to close communication between the first flow passage and the second flow passage while providing communication between the first flow passage and the third flow passage, the annular valve seat member having an internal wall surface of gradually increasing dimension between the exit opening and the entrance opening thereof, a thermally responsive actuator device having a larger area portion encompassed by a larger diameter portion of the internal wall surface of the annular valve seat member, the thermally responsive actuator device having a smaller area portion encompassed by a smaller diameter portion of the internal wall surface of the annular valve seat member, so that the area for fluid flow at the flow exit opening of the annular valve seat member is at least equal to the area for fluid flow at the flow inlet opening of the annular valve seat member, the thermally responsive actuator member having a portion attached to the hollow cylindrical closure member for movement thereof.

6. The thermally responsive valve mechanism of claim 5 in which the largest area portion of the thermally responsive actuator device is encompassed by the largest area portion of the internal wall surface of the annular valve seat member.

* * * * *